United States Patent
Gutmann et al.

(10) Patent No.: US 10,118,990 B2
(45) Date of Patent: Nov. 6, 2018

(54) FLAME-RESISTANT POLYAMIDE, METHOD FOR THE PRODUCTION OF SAID FLAME-RESISTANT POLYAMIDE, AND USE OF SAID FLAME-RESISTANT POLYAMIDE

(71) Applicant: DEUTSCHE INSTITUTE FÜR TEXTILUND FASERFORSCHUNG DENKENDORF, Denkendorf (DE)

(72) Inventors: Rainer Gutmann, Ostfildern (DE); Sabine Gneiting, Oberboihingen (DE)

(73) Assignee: DEUTSCHE INSTITUTE FUR TEXTILUND FASERFORSCHUNG DENKENDORF, Denkendorf (DE)

( * ) Notice: Subject to any disclaimer, the term of this patent is extended or adjusted under 35 U.S.C. 154(b) by 0 days.

(21) Appl. No.: 15/790,323

(22) Filed: Oct. 23, 2017

(65) Prior Publication Data
US 2018/0044471 A1 Feb. 15, 2018

Related U.S. Application Data

(62) Division of application No. 14/780,897, filed as application No. PCT/EP2014/023159 on Mar. 27, 2014.

(30) Foreign Application Priority Data

Mar. 28, 2013 (DE) .......................... 10 2013 005 353

(51) Int. Cl.
  *C08G 69/00* (2006.01)
  *C08L 77/00* (2006.01)
  *C08G 69/42* (2006.01)
  *C08J 5/00* (2006.01)
  *C08G 69/02* (2006.01)
  *C08L 77/06* (2006.01)

(52) U.S. Cl.
  CPC .............. *C08G 69/42* (2013.01); *C08G 69/02* (2013.01); *C08J 5/00* (2013.01); *C08J 2377/06* (2013.01); *C08L 77/06* (2013.01); *C08L 2205/02* (2013.01)

(58) Field of Classification Search
None
See application file for complete search history.

(56) References Cited

U.S. PATENT DOCUMENTS

| 5,750,603 A * | 5/1998 | Asrar | .................... C08G 69/42 |
| | | | 524/139 |
| 2012/0172512 A1* | 7/2012 | Ishii | ........................ C08L 25/18 |
| | | | 524/405 |

FOREIGN PATENT DOCUMENTS

JP          1993247068 A          9/1993

* cited by examiner

*Primary Examiner* — Ana L. Woodward
(74) *Attorney, Agent, or Firm* — Fay Sharpe LLP

(57) ABSTRACT

The invention relates to a flame-resistant polyamide as a product of the condensation of dicarboxylic acids with diamines and with a flame-retardant phosphorus compound, which flame-resistant polyamide is characterized in that the flame-resistant polyamide FR contains, in the main chain thereof phosphinic acid amide structural units of formula (II) —PO($R^1$)—NH— (II) in addition to the amide structural units of formula (I) CO—NH— (I), in which formula (II) RI means hydrogen or an organic group and can differ in the individual phosphinic acid amide structural units within the main chain and that the polyamide FR achieves a relative viscosity, measured as a 1% solution in 96% sulfuric acid at 25° C., of at least 2.0 (in accordance with DIN 51562). The invention further relates to a method for producing said flame-resistant polyamide FR. In said method, one or more diamines are polycondensed with one or more dicarboxylic acids under pressure and at elevated temperature in the presence of water and with one or more diphosphinic acids and/or one or more phosphino-carboxylic acids by means of a polyamide synthesis. After the polycondensation, the pressure in the reaction chamber is reduced to less than 1 bar. The flame-resistant polyamide can be advantageously used to produce molded bodies, in particular films, components, and filaments or filament yarns.

18 Claims, No Drawings

FLAME-RESISTANT POLYAMIDE, METHOD FOR THE PRODUCTION OF SAID FLAME-RESISTANT POLYAMIDE, AND USE OF SAID FLAME-RESISTANT POLYAMIDE

The invention relates to a flame-retardant polyamide as a condensation product of dicarboxylic acids with diamines and also a flame-retardant phosphorus compound, to a process for producing this flame-retardant polyamide, and to its advantageous use for producing shaped articles, more especially filament yarns.

Polymers based on commercial polyamides without appropriate modifying additives as needed to achieve non-flammability are assigned to fire protection class "B" (DIN 4102-BS 5852-M1-UL94). Only by means of additional treatment is it possible to attain class "B1" (materials that are not easily flammable). This treatment may involve incorporation of a suitable flame retardancy component into the polyamide chain or polymer matrix, or alternatively the treating of polyamide yarns or polyamide textiles with suitable flame retardants. The degree to which such materials may be rendered not easily flammable is dependent on the additions and on the method utilized to achieve this condition, and is operated individually according to the applications and the statutory impositions. One of the most widespread protocols for assessing combustibility is described by Underwriters Laboratories in the UL94 protocol, which has entered with identical content into standards IEC/DIN EN 60695-11-10 and −20 and into the Canadian CSA C 22.2. It involves testing the quality of non-easy flammability using a Bunsen burner flame, and classifying it in different stages as follows:

- HB: slow burning of a sample clamped horizontally (with self-extinction),
- V-2: extinction of a sample clamped vertically within 30 seconds,
- V-1: extinction of a sample clamped vertically within 30 seconds without burning dripping of molten plastics material, and
- V-0: extinction of a sample clamped vertically within 10 seconds.

The methods that are nowadays typically utilized in order to render a material flame-retardant may be subdivided into physical and chemical methods. In the case of physical polymer modification, it is usual to produce two-phase systems, in one case by incorporating flame-retardant additives—of either mineral or organic nature—into the polymer. Alternatively, the surface of the polymeric material is coated or treated, with flame-retardant additions being applied that are anchored physically, but may also be attached reactively, this amounting in itself to chemical modification. In the case of true chemical polymer modification, distinctions may be made between modification in the polymer chain, the addition of a comonomer in the polymerization step that is active as a flame retardant, modification via polymer-analogous reactions on the main chain in the form of grafting and/or branching by the FR component on the polymer main chain, and also modification by subsequent crosslinking of the polymer chains with one another, to form, for example, a radically initiated polymer network, possibly producing an "unmeltable" polymer.

The function of all of the modifications described is to prevent the process of fire by interrupting the mechanism of the burning process at one point. To this end, the additions, in ways that are different in some cases, intervene in the known fire cycle which begins with thermal decomposition of the polymer to form low molecular mass, gaseous components. The pyrolysis gases diffuse from the polymeric material and come into contact with the atmospheric oxygen, at which point they are oxidized with release of energy—this is the beginning of flame formation. The energy released, in the form of heat, heats the material further and so additionally accelerates the fire process. The point at which the added flame-retardant component becomes active is determined by its chemistry. Among the literature describing these mechanisms are two comprehensive monographs (M. Le Bras, G. Camino, S. Bourbigot, R. Delobel (Eds.): Fire Retardancy of Polymers, The Use of Intumescence, Roy. Soc. Chem. Pub., Cambridge, 1998 and also J. Troitzsch: Plastics Flammability Handbook, Carl Hanser Verlag, Munich, 2004), which represent the state of the research. Concerning the use of flame retardants that are nowadays customary, there is a similarly comprehensive study by the Umwelt Bundesamt with the report number UBA-FB 000171/2. The three-part report, with the title "Substituting environmentally relevant flame retardants: assessment fundamentals", consists of volume I "Results and summary overview", volume II "Flame retardancy treatment of selected products—practical approach: state of the art, trends, alternatives" (chapter VI, "Textile applications", is especially significant), and volume III "Toxicological and ecotoxicological profiles of selected flame retardant compounds" (published by the authors A. Leisewitz, H. Kruse, E. Schramm, W. Schwarz, O. Paulsen, C. Schau, M. Wieben, U. Böhde in March 2001).

From olden times through to the present day, fire protection has been a function of macroeconomic significance as well, with topical issues now also including not only the fundamental modes of activity in fire fighting and in preventing combustion but also the resulting toxic and ecotoxic aspects of the chemistry of the burning process. As everyday experience tells us, shutting off the focus of the fire from a supply of air or oxygen leads to the extinguishing of the fire. This principle is carried out mechanically when a fire is quenched. For many years, moreover, this basic idea has been exploited through the use of halogen-containing systems as fire retardants. In the event of fire, these systems emit chemical components which by virtue of rapid radical reactions are capable of chemically binding the oxygen in the immediate vicinity of the fire and hence of reducing the concentration of free oxygen. The oxygen is then no longer sufficiently available for the burning of the polymer, and the flame is extinguished. The halogen-containing compounds suitable for this purpose are multiply substituted unsaturated, cyclic aliphatics and heteroaliphatics, and also fused aromatic systems or those which are bridged via heteroatoms (U.S. Pat. No. 3,810,861 A, DE 2604275 A1, EP 79177 A1). These compounds are frequently also used in combination with metal oxides/hydroxides, carbonates, acetates, phosphates, borates, etc., since these compounds have a synergistic effect on flame retardancy (DE 2114235 A, AT 355307 B, DE 2114235 A, U.S. Pat. No. 3,810,861 A). Examples of this are found in a variety of patents, usually older ones, since in more recent times these systems have come under considerable pressure on account of the toxic and ecotoxic products they generate in service.

As an alternative to this, recent years have more and more seen investigations into using additives capable of preventing the polymer from burning through the development of a protective layer. This effect is achieved by the addition of multicomponent systems to the various polymers, these additions being capable of promoting carbonization, examples being polyalcohols, or of giving off propellant gases, examples being melamine compounds, or of releasing water, examples being phosphorus-containing acids, which undergo transition into polyphosphoric acids and so generate a high-melting-point or porous protective coat on the polymer surface. This removes heat from the fire, makes it more difficult for heat to diffuse, and reduces the emission of pyrolysis gases and/or the diffusion of oxygen (DE 4015490 A1, EP 245207 A2, EP 496241 A1). A disadvantage of these systems is the high level at which they have to be added, leading to considerable processing problems especially in the case of extrusion to fibres, and also having a capacity to impair the service properties to such a significant extent that use in the fibre segment is no longer possible, whereas this is not an exclusion criterion in the case of other extrusion processes (S. V. Levchik, E. D. Weil; A Review of Recent Progress in Phosphorus-based Flame Retardants, J. Fire Sci. 2006, 24, 345). The question of the level of addition and of the resultant alterations in processing and service properties therefore significantly distinguishes the use of flame retardants in textiles from the other applications, which are usually greater in volume terms (electrical and electronics sector, construction segment, IT and TV applications), and calls for separate solutions, hitherto unavailable especially in the case of the polyamides. Two exceptions to this are only the very recently described treatment of polyamide 6.6 textiles by surface modification and crosslinking with thiourea (J. Sun, X. Gu, Q. Dong, S. Zhang et al.; Polym. Adv. Technol. 2013, 24(1), 10) and also the system (Melliand Textilberichte 4/2012, page 210), now commercialized, of a halogen-free coating for polyamide fibres (US 20090176424 A1, WO 2010/086621 A2), which produces effective flame retardancy from a silicone-containing system and additive components via the formation of a protective nanocomposite carbon layer (A. B. Morgan; Flame Retardant Polymer layered Silicate Nanocomposites: A Review of Commercial and open Literature Systems, Polym. Adv. Technol. 2006, 17(4), 206).

In contrast, systems based only on phosphinic or phosphonic acid derivatives, especially if they are incorporated into the polymer chain, can be added at much lower levels, while nevertheless developing an adequate flame retardancy effect. But on this basis, as is the case for all other common flame-retardant systems, there are no systems suitable for application as an additive in the context of polyamide fibre manufacture, since the temperature stability of the phosphorus compounds is generally inadequate. For use in other polyamide applications, in contrast, such as in electrical circuit boards, there are solutions in existence that use phosphorus compounds alone, which can be admixed to the polymer during processing.

In contrast to this, phosphinic or phosphonic acid derivatives have been used for many years in polyester fibre applications. These applications are dominated essentially by one product (Trevira CS), in which the phosphorus component (Exolit® PE110) is incorporated by condensation in the polymer main chain (EP 0551850 A1, EP 1837338 A1, EP 1837340 A1). Methods for using these compounds or their structurally similar counterparts in polyamides as well, and of extruding these polyamides to form fibres, have in fact been described (EP 1935894 A1, U.S. Pat. No. 4,649,177, U.S. Pat. No. 5,750,603, U.S. Pat. No. 5,952,406). To date, however, there have been no corresponding products on the market, one of the reasons for this being that especially in the preparation of a copolyamide, in other words during the condensation of the phosphorus component into the polyamide chain, the requisite molecular weights are not developed and the copolyamide must be subjected to postcondensation in order to achieve the necessary processing capacity of the melt in the context of fibre manufacture. After this known method, polymerization is ended by the polymer being discharged from the reactor and pelletized, and later subjected to solid-phase polycondensation. Only during this procedure is the molecular weight necessary for use as an extrudable polymer developed. This approach has been found not to be advantageous.

Also claimed is the use of phosphorus-containing prepolymers with addition of resin/curing agent systems. These systems allow reduction to be achieved in the required mass fraction of the phosphorus component in the context of the flame retardancy effect, this being beneficial for the mechanical properties of the material (DE 102006060339 A1, DE 102005015605 A1). Furthermore, various cyclic phosphinic acid derivatives based on 9,10-dihydro-9-oxa-10-phosphaphenanthrene 10-oxide (DOPO) are described which as well as use preferably in thermosets are said to be also used in thermoplastic polyesters and polyamides for fibre manufacture (DE 2646218 A1, EP 1710264 A2, EP 1710264 B1).

Starting from the prior art as outlined above, the aim of the invention is that of proposing improved flame-retardant polyamides, an especially suitable process for producing them, and also advantageous uses of these flame-retardant polyamides.

The invention achieves this object by means of a flame-retardant polyamide FR as condensation product of dicarboxylic acids with diamines and also a flame-retardant phosphorus compound, which is characterized in that the flame-retardant polyamide FR contains in its main chain not only the amide structural units of the formula (I)

—CO—NH—                    (I)

but also phosphinamide structural units of the formula (II)

—PO(R¹)—NH—                (II), $R^1$ being hydrogen or an organic group, and in which individual phosphinamide structural units within the main chain may be different, and in that the polyamide FR attains a relative viscosity, measured as a 1% strength solution in 96% strength sulfuric acid at 25° C., of at least 2.0 (according to DIN 51562).

One especially advantageous embodiment of the flame-retardant polyamide of the invention is that the aforesaid group $R^1$ is a linear, cyclic or branched $C_1$-$C_6$ alkyl group, more especially a $C_1$-$C_3$ alkyl group, an aryl group, more especially having up to three fused or unfused rings, more especially in the form of a phenyl, benzyl, naphthyl, phenanthryl, mesityl or tolyl group, an alkylaryl group, more especially a triphenylmethyl group, and/or an arylalkyl group, more especially an i-propylphenyl, t.butylphenyl or nonylphenyl group. The $C_1$-$C_3$ alkyl group here is preferably a methyl, ethyl and/or 2-propyl group.

As a result of the invention it is found that the desirable improvement in flame retardancy is achieved through the phosphinamide structural units of the formula (II) identified that are introduced into the polyamide in accordance with the process described hereinafter. It is advantageous here that the flame-retardant polyamide FR, by virtue of the phosphinamide structural units, based on the pure flame-retardant polyamide FR, contains at least 0.01 and/or not more than 10.0 wt % of phosphorus, it being preferred for the polyamide FR to contain 0.01 to 8 wt %, more especially 0.01 to 4.0 wt %, of phosphorus, an especially preferred range being that from 0.01 to 1.5 wt % of phosphorus. From a practical standpoint, the following pairs of values for the phosphorus content may be identified as being advantageous: 0.1 to 10 wt %, preferably 0.5 to 6 wt %, and more especially 0.1 to 1.5 wt % of phosphorus. Within the weight-percentage framework conditions identified above, improved flame retardancy in the target polyamide FR is achieved to a particular extent without detrimental effect on the otherwise desirable qualities of the polyamide FR. It has proven advantageous here for the flame-retardant polyamide of the invention to have a nonflammability which conforms to the mandates of the UL94 V.0 protocol.

The invention opens up further possibilities for modification to the flame-retardant polyamide FR, including, for example, the inclusion of property-improving additives, more especially of UV stabilizers, heat stabilizers and/or matting agents. There is in fact no quantitative restriction on these additives. Nevertheless, it is generally judicious if the flame-retardant polyamide FR contains about 0.01 to 1.0 wt %, more especially 0.5 to 0.7 wt %, of additive.

For the forms of further processing of the flame-retardant polyamide FR, as will be addressed later on below, it has proven advantageous if the aforementioned relative viscosity (measured according to DIN 51562) is at least 2.4. Particular advantageous results are achieved when the relative viscosity (measured according to DIN 51562) attains at least 2.4 and/or not more than 4.0.

The aforementioned relative viscosity of the flame-retardant polyamide FR of the invention is a parameter which is important in relation to further processing, especially in the context of an extrusion process, such as a blow-moulding, injection-moulding or melt-spinning process. There are various specific applications that come to the fore here and will be addressed later on below, including especially the production of monofilament, multifilament, and staple fibre yarns. In this relation it would be possible equivalently, specifying framework values, to specify molecular weights within which the invention can be realized practically and advantageously, with the molecular weight arising from the relative viscosity (see above) when the latter is developed further by way of the Huggins equation, using the constant $k_H$=0.30 for the intrinsic viscosity and developing that further by way of the Mark-Houwink-Staudinger equation, using K=0.115 (ml/g) and $\alpha$=0.67, and being present in the form of the viscosity-average molecular weight (Mv), being situated preferably from about 15,000 g/mol to 65,000 g/mol, more especially from 20,000 g/mol to 50,000 g/mol. Accordingly, a suitable molecular weight report would refer to the relative viscosity, to be determined initially in a simple way. However, the relative viscosity determined is an especially suitable parameter for the skilled person in order for the invention to be practised in the desirable way with achievement of the stated aim.

The invention is not confined to specific diamines and dicarboxylic acids as base materials for producing the target flame-retardant polyamide. Nevertheless, the following combinations may be stated as being especially advantageous:

PA6.9 (hexamethylenediamine/azelaic acid),
PA6.12 (hexamethylenediamine/dodecanoic acid),
PA4.6 (tetramethylenediamine/adipic acid),
PA12.12 (dodecanediamine/dodecanedioic acid) or
PA6.6 (hexamethylenediamine/adipic acid),
in each case in a form modified in accordance with the invention.

One especially advantageous development of the technical concept of the invention is a flame-retardant polyamide which is present in a mixture with a further polyamide in the form of a non-flame-retardant polyamide, more especially with polyamide 6 (polycaprolactam), the phosphorus content of the mixture being adjusted by the flame-retardant polyamide FR included to at least 0.01 wt % and/or not more than 10.0 wt %, more especially not more than 8.0 wt %, with the phosphorus content from 0.01 to 4.0 wt %, more especially 0.01 to 1.5 wt %, being especially advantageous. The following may also be stated as preferred framework conditions: 0.1 to 10.0 wt %, more especially 0.5 to 6.0 wt %.

In accordance with the invention, then, a flame-retardant or incombustible polyamide FR can be obtained by melting the flame-retardant polyamide in the mixture identified and, especially, extruding it to form a multifilament yarn. As a result of the blending with a polyamide 6 (polycaprolactam), for example, the phosphorus content of the multifilament yarn is reduced further and can be taken down to a level where the limit of incombustibility is obtained. The preferred phosphorus content of a polymer mixture of this kind, as shown above, is from 0.01 to 1.5 wt %. On further processing of such a mixture, to give the aforementioned multifilament yarn, for example, it is especially advantageous for the relative viscosity to be adjusted accordingly. It is judicious for the mixture of flame-retardant polyamide FR and the customary or standard, non flame-retardant polyamide to attain a relative viscosity, measured as a 1% strength solution in 96% strength sulfuric acid at 25° C., of at least 2.0, more especially of at least 2.4 and/or not more than 4.0 (measured according to DIN 51562). The phosphorus content of the mixture here is, especially, at least 0.05%. The relative viscosity is generally not more than 3.5, more especially not more than 2.9. In general it is less than 2.7. With regard to the adjustment of the optimum viscosity, application-specific aspects also have a part to play. Here it would be possible to specify the following for the relative viscosity as determined above: for technical yarns with high strength values, more than 3, more especially up to 3.5; for yarns for carpets, 2.7 to 3.0; and for yarns for apparel textile applications, 2.4 to 2.7.

The flame-retardant polyamide FR of the invention, described above, can be produced especially advantageously by a process in which in a polyamide synthesis one or more diamines are subjected to polycondensation with one or more dicarboxylic acids under a pressure of at least 16 bar, more especially a pressure from 20.0 bar to 25 bar, and at elevated temperature, more especially a temperature of less than 295° C., more especially from 230° C. to 280° C., in the presence of water, the amount of water more especially being not more than 25 wt % and/or more especially at least 10 wt %, based on the reaction mixture, in order to build up the pressure in the reactor that is required at the selected reaction temperature, and with one or more diphosphinic acids of the formula (III)

and/or with one or more carboxy-phosphinic acids of the formula (IV),

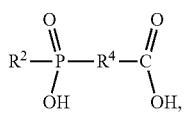

(IV)

the dicarboxylic acid being replaced in part, under the stoichiometric conditions on which the polycondensation is based, by the diphosphinic acid (III) and/or by the carboxy-phosphinic acid (IV), the dicarboxylic acid, the diphosphinic acid, and the carboxy-phosphinic acid being subjected to the polycondensation in the form of the AH salts with the diamines used, the pressure in the reaction space after the polycondensation being lowered to less than 250 mbar, more especially less than 10 mbar, thereby shifting the polymerization equilibrium more to the side of the high-viscosity product, and the following definitions applying to the formulae (III) and (IV):

$R^2$ and $R^3$, independently of one another, are a linear, cyclic or branched $C_1$-$C_6$ alkyl group, more especially a $C_1$-$C_3$ alkyl group, an aryl group, more especially having up to three fused or unfused rings, more especially in the form of a phenyl, benzyl, naphthyl, phenanthryl, mesityl or tolyl group, an alkylaryl group, more especially a triphenylmethyl group, and/or an arylalkyl group, more especially an i-propylphenyl, t.butylphenyl or nonylphenyl group, and $R^4$ is a divalent organic group, more especially in the form of a linear, cyclic or branched $C_1$-$C_{10}$ alkylene, more especially $C_1$-$C_4$ alkylene group, a $C_1$-$C_{10}$ alkenylene, more especially a $C_1$-$C_6$ alkenylene group, or a $C_6$-$C_{10}$ arylene, more especially a 1,4-phenylene group.

In one especially advantageous development of the process of the invention, the pressure is lowered to less than 100 mbar, preferably to 1 to 100 mbar, more especially 1 to 50 mbar. It is especially advantageous if the pressure is lowered to 1 to 10 mbar.

In a further advantageous embodiment of the invention, the proportion of the reactants in the form of the diamines, dicarboxylic acids, diphosphinic acids, and the carboxy-phosphinic acids is adjusted such that the phosphorus content of the flame-retardant polyamide process product obtained, based on the polyamide FR, is at least 0.01 wt % and/or not more than 10.0 wt %; further advantageous framework conditions are referred to above.

A further advantageous embodiment of the process of the invention is that the flame-retardant polyamides produced from an AH salt of the diphosphinic acid of the formula (III) and/or of the carboxy-phosphinic acid of the formula (IV) are present without blending or in a blend with a further, non-phosphorus-containing, non-flame-retardant polyamide and are passed on for further use.

The point of departure of the invention, then, is the finding that in order to produce the flame-retardant polyamide FR of the invention, the incorporation of diphosphinic acid and/or of a carboxy-phosphinic acid by condensation in the main chain of the polyamide is employed, especially and by way of example in connection with the synthesis of PA6.6 from adipic acid and hexamethylenediamine, with an AH salt of the phosphorus-containing acids being provided in accordance with the AH salt prepared in the synthesis of PA6.6 from adipic acid and hexamethylenediamine. In the context of the process of the invention, accordingly, an intrinsically incombustible or flame-retardant copolyamide is produced wherein the respective dicarboxylic acid, more especially adipic acid, is replaced in part by a diphosphinic acid and/or by a mixed carboxy-phosphinic acid. According to the mass fraction employed, these reactants are incorporated statistically into the polyamide chain, without substantial influence on the polymerization reaction or on the physical properties of the polyamide. It is important here, in order to achieve optimization of the technical proposal according to the invention, to polymerize the two AH salts jointly, in a suitable mixing proportion, in a polymerization plant that is customarily utilized for the synthesis of PA6.6, the viscosity built up being that customary for subsequent fibre application. In this context, reference may be made to Table 1 hereinafter, which identifies aliphatic diamines and aliphatic dicarboxylic acids that are contemplated in accordance with the invention, along with the respective melting point of the corresponding polyamides. The technological observations above, although relating especially to adipic acid and hexamethylenediamine, apply generally to all of the pairings contemplated in accordance with the invention, such as carboxylic acid/diamine and also diphosphinic acid and/or carboxy-phosphinic acid.

The polycondensation that is carried out in the process of the invention follows the standard rules, which are well known to the skilled person. In particular, in the process according to the invention as well, it is important to observe, preferably, the exact stoichiometric ratio of 1:1 for the pairing of diphosphinic acid and/or carboxy-phosphinic acid with the diamine. The following specific observations may be made with regard to the process of the invention:

The polycondensation takes place preferably with addition of water at a temperature as specified above, judiciously within from three to four hours, under a pressure as specified above. This is followed by depressurization through a needle valve and by the discharge of the steam, with the torque on the stirrer climbing from 0.5 Nm to 8-9 Nm within 45 minutes. The polymer melt is then discharged, pelletized, washed, and dried in a fine vacuum. In this form, processing takes place by a melt spinning process, generating a multifilament yarn which cannot be induced to burn even on permanent exposure to a flame.

In principle here the general rule is that it is advantageous for the proportions of the reactants in the form of the diamines, dicarboxylic acids, diphosphinic acids, and carboxy-phosphinic acids to be adjusted such that the phosphorus content of the resulting polyamide FR complies with the advantageous framework conditions stated above.

It is useful if attention is paid to the preparation of the AH salts that are used in the process of the invention. Accordingly it is an advantage for the AH salts of the diphosphinic acid of the formula (III) and/or of the carboxy-phosphinic acid of the formula (IV) to be prepared alone or in a blend with a further (standard) AH salt of the dicarboxylic acid and for these reactants to be subjected to the polycondensation to give the flame-retardant polyamide FR. These general statements can be usefully elucidated by specific descriptions as follows:

Hence it is preferred, as a mixed carboxy-phosphinic acid, to make use, for example, of 3-hydroxyphenylphosphinyl-propionic acid (3-HPP) in a concentration for which the amount used results in a phosphorus content of the completed copolyamide that, as already identified above, is situated especially in the order of magnitude of around 1 wt %. In this context it has proven judicious to carry out the copolyamide synthesis using the phosphinocarboxylic acid in the form of AH salts, with use of the diamine, more especially of 1,6-diaminohexane, together with an AH salt of the dicarboxylic acid, more especially of adipic acid, and of the diamine, more especially of 1,6-diaminohexane. In this case, moreover, it has proven advantageous to use the former AH salt (that of the phosphorus-containing acid) in comparison to the latter salt (dicarboxylic acid) in a mass fraction in the range from 10% to 90%.

The flame-retardant polyamides of the invention and the products produced by the process described exhibit advantageous properties when they are further processed to give shaped articles, more especially to give films, components and monofilaments or filament yarns. This takes place judiciously as part of a melting process, more especially with a blow-moulding process and/or an injection-moulding process for the production of films and/or components, and also a filament spinning process for producing monofilament and/or multifilament yarns and also staple fibre yarns. In the case of production by a filament spinning process, it is judicious for the yarns to be produced in a melt spinning/winding unit and to be taken off under a spinneret at a speed from 500 to 5000 m/min, more especially from 1500 to 4500 m/min, and wound to form reels or cut to form stacks and pressed to form bales. It is especially advantageous here if the production of the yarns is controlled, by variation of the polymer throughput in the upstream extruder and of the winding speed, in such a way that the linear filament density of the resulting filament yarns is adjusted to 1 to 20 dtex. It is significant, and results in advantages, if the ultimate application-related adjustment of the linear filament density takes place in a customary drawing or draw-texturing step such that the linear filament density is to 20 dtex in relation to subsequent use for producing carpets, 1 to 5 dtex for producing apparel items, and less than about 1 dtex for producing textiles based on microfibres. It is therefore found that the filaments or filament yarns produced and also staple fibres obtained from them can be employed advantageously for producing sheetlike textile structures, more especially formed-loop knits, woven fabrics, nonwoven webs, and drawn-loop knits.

In connection with the further processing of the flame-retardant polyamide of the invention into filament yarns or staple fibre yarns, reference may be made to the following useful development: it is advantageous, then, if the process of the invention, more especially for polymer processing in an extruder at temperatures of not more than 285° C., is controlled such that the linear filament density of the filament yarns produced is adjusted to 0.4 dtex to 20 dtex. This adjustment to the linear filament density takes place preferably such that in the subsequent application of the filament yarn as technical yarn or as yarn for the home textiles segment, the linear filament density is from about 10 to 20 dtex, or from about 1 to 5 dtex for application in the apparel sector, and less than about 1 dtex, more especially below 0.8 dtex, in the case of textiles based on microfibres; specific reference to this has already been made.

The implementation of the process of the invention or the actualization of the invention in the form of the flame-retardant polyamide opens up innovative possibilities for producing intrinsically flame-retardant polyamides, starting from phosphorus-containing mixed AH salts of the type designated, without any need for fundamental change in the implementation of the polymer synthesis or polycondensation or in the production of the extruded products, it being necessary nevertheless to take account of the deviations relevant to the invention, as detailed above. This becomes possible in that the necessary doping of the polyamides produced with a desirable phosphorus fraction meeting the framework conditions identified above, more especially below 1 wt %, does not substantially influence the properties of the extruded products that are normally the target in the respective application.

This constitutes a hitherto unknown technical proposal in which, relative to the existing practice, in which predominantly saltlike and/or low-molecular-mass phosphorus compounds are added at comparatively higher concentrations, homogeneous polymer systems are generated, with lower phosphorus contents, by incorporation of the phosphorus component into the polymer chain.

Addressed above was a costly and inconvenient after-condensation as part of a solid-phase polycondensation procedure. The invention displays a significant advantage here: with the process of the invention, the required molecular weight of the flame-retardant polyamide FR can be obtained directly at the end of the polymerization reaction, by lowering the pressure within the reactor under atmospheric pressure, it being especially advantageous that the pressure is lowered to 1 to 100 mbar, preferably 1 to 50 mbar, more especially to 1 to 10 mbar. This makes the process of the invention very advantageous relative to the outlined prior art with a downstream solid-phase polycondensation procedure. As a result of the equilibrating operation in accordance with the known process, degradation reactions are triggered, which impair polymer quality and/or counteract a sufficient drop in molecular weight, something which is avoided completely in accordance with the invention. Here, moreover, as already stated, there is no need for the process step, required in the prior art, of solid-phase polycondensation, which leads to deleterious products and, moreover, is associated with time and costs.

The invention is explained in more detail below by examples which represent a typical operating process with the individual operating steps occurring therein, from the preparation of the starting compounds in the synthesis up to the coloured product. These examples are intended to be only explanatory in character.

EXAMPLE 1

Preparation of the Modified AH Salt

3-Hydroxyphenylphosphinlypropionic acid (HPP) is dissolved in 10-20 times the amount of water and at a temperature of 40° C. Then the equimolar amount of 1,6-diaminohexane (HDMA) is added in portions, the pH of the aqueous solution climbing from pH 2 to pH 7. After the water solvent has been stripped off, the modified AH salt remains as a white residue which can be recrystallized from methanol. The yield achieved in this operation is 97.4%. The melting point of the AH salt as determined from a DSC measurement is 226-227° C.

EXAMPLE 2

Synthesis of the Phosphorus-Modified Polyamide

A steel autoclave with a pressure stability rating to 25 bar is charged with the modified AH salt according to Example 1 and with a customary, commercial AH salt formed from 1,6-diaminohexane and adipic acid in a weight ratio of 1:9, and also with the approximately four-times molar amount of water, and this initial charge is placed under nitrogen. The reactor is then sealed and its contents are heated to 223° C. over the course of three hours. During this time, the pressure in the reactor rises to 20.5 bar. This is followed by slow depressurization over the course of 45 minutes, with further heating to 276° C. at the same time. The water which was liberated during the reaction is removed from the reaction product via an ascending condenser and a descending condenser. Toward the end of the depressurization and evacuation phase in the reactor, the torque of the stirrer undergoes a sharp increase and reaches a constant value which signals the time of the discharge of the polymer from the reactor. Discharge of the melt from the reactor is accomplished by application of nitrogen pressure in the form of a strand, which solidifies directly beneath the discharge valve in an ice bath and, after removal from the ice bath, is processed directly in a pelletizer to form extruded pellets. The pellets thus produced are subsequently boiled with water and dried for further processing to a residual moisture content of 250 ppm at 100° C. under reduced pressure. The phosphorus content of the completed polymer attains a maximum level of about 1%. The melting point of the polymer is 252° C. and the relative viscosity of the 1% strength polymer solution, measured in 96% strength sulfuric acid at 25.00° C., is 2.48. The colorimetric values measured on the pellets are determined as being L*=59.16, a*=+1.23, and b*=+18.99.

EXAMPLE 3

Production of a Mixture of Modified Polyamide And Commercial PA6 Pellets

The modified polyamide produced above is mixed in a weight ratio of 1:9 with commercial PA6 pellets (e.g.: Ultramid BS24N03 from BASF) and is processed in the form of a dry blend. This is done using a melt spinning unit which comprises a single-screw extruder, a melt spinning pump and spinneret pack, and also a high-speed winder, with which the filament yarn produced is wound up onto reels at a take-off speed of 4000 m/min. The filament yarn consists of 24 individual filaments and possesses a linear density of about 63 dtex. The mechanical yarn data determined in the tensile test are 38.4 cN/tex for the tensile strength, 54% for the elongation at break, and 283.4 cN/tex for the initial modulus. As for the testing of the burning behaviour of the formed-loop knit produced from the filament yarn after-drawn to approximately 25% residual elongation, it is found in a horizontal burning test that the formed-loop knit cannot be ignited even with a Bunsen burner flame that is applied for several seconds.

TABLE 1

Melting temperatures of polyamides made from aliphatic diamines and aliphatic dicarboxylic acids

| Diamine | Dicarboxylic acid | Polyamide | Melting temp. [° C.] |
|---|---|---|---|
| Butane-1,4-diamine | Adipic acid | 4.6 | 278-295 |
| | Pimelic acid | 4.7 | 233 |
| | Suberic acid | 4.8 | 250 |
| | Azelaic acid | 4.9 | 223 |
| | Sebacic acid | 4.10 | 239 |
| Pentane-1,5-diamine | Glutaric acid | 5.5 | 198 |
| | Adipic acid | 5.6 | 223 |
| | Pimelic acid | 5.7 | 183 |
| | Suberic acid | 5.8 | 202 |
| | Azelaic acid | 5.9 | 179 |
| | Sebacic acid | 5.10 | 186-195 |
| Hexane-1,6-diamine | Adipic acid | 6.6 | 255-260 |
| | Pimelic acid | 6.7 | 202-228 |
| | Suberic acid | 6.8 | 220-232 |
| | Azelaic acid | 6.9 | 185-226 |
| | Sebacic acid | 6.10 | 209-223 |

TABLE 1-continued

Melting temperatures of polyamides made from aliphatic diamines and aliphatic dicarboxylic acids

| Diamine | Dicarboxylic acid | Polyamide | Melting temp. [° C.] |
|---|---|---|---|
| Heptane-1,7-diamine | Adipic acid | 7.6 | 226-250 |
| | Pimelic acid | 7.7 | 196-2214 |
| | Sebacic acid | 7.10 | 187-208 |
| Octane-1,8-diamine | Adipic acid | 8.6 | 235-250 |
| | Suberic acid | 8.8 | 205-225 |
| | Sebacic acid | 8.10 | 197-210 |
| Nonane-1,9-diamine | Adipic acid | 9.6 | 205 |
| | Azelaic acid | 9.9 | 165 |
| | Sebacic acid | 9.10 | 179 |
| Decane-1,10-diamine | Adipic acid | 10.6 | 230-236 |
| | Suberic acid | 10.8 | 208-217 |
| | Sebacic acid | 10.10 | 194-203 |

Through the combination of the aliphatic diamines and dicarboxylic acids identified, there are a large number of polyamides obtainable whose melting temperatures lie within a range that is favourable for the melt-spinning process, from about 180 to 280° C.

The invention claimed is:
1. A process for producing a flame-retardant polyamide comprising polycondensation of one or more diamines in the form of a AH salt with one or more dicarboxylic acids under an initial pressure of between 16 and 25 bar at elevated temperature of between 230° C. to 280° C., in the presence of water, in order to build up the pressure in the reactor that is required at the selected reaction temperature, and with one or more diphosphinic acids of the formula (III)

(III)

and/or with one or more carboxy-phosphinic acids of the formula (IV),

(IV)

the dicarboxylic acid being replaced in part, under the stoichiometric conditions on which the polycondensation is based, by the diphosphinic acid (III) and/or by the carboxy-phosphinic acid (IV), the pressure in the reaction space after the polycondensation being lowered to less than 250 mbar, and wherein the following definitions applying to the formulae (III) and (IV):

$R^2$ and $R^3$, independently of one another, are a linear, cyclic or branched $C_1$-$C_6$ alkyl group or an aryl group, and $R^4$ is a divalent organic group, said polycondensation yielding a flame-retardant polyamide FR containing in its main chain not only the amide structural units of the formula (I)

—CO—NH—     (I)

but also phosphinamide structural units of the formula (II)

$$—PO(R^1)—NH— \quad (II),$$

R¹ being hydrogen or an organic group, and in which individual phosphinamide structural units within the main chain may be different, and in that the polyamide FR attains a relative viscosity, measured as a 1% strength solution in 96% strength sulfuric acid at 25° C., of at least 2.0 and not more than 4.0 (according to DIN 51562), wherein the proportion of the reactants in the form of the diamines, dicarboxylic acids, diphosphinic acids, and the carboxy-phosphinic acids is adjusted such that the phosphorus content of the flame-retardant polyamide process product obtained, based on the polyamide FR, is between 0.01 wt % and 10.0 wt %.

2. The process according to claim 1, wherein the polyamide FR contains 0.01 to 8 wt %, of phosphorus.

3. The process according to claim 1, further comprising the addition of an additive selected from UV stabilizers, heat stabilizers and/or matting agents.

4. The process according to claim 3, further comprising the addition of 0.01 to 1.0 wt % of said additive.

5. The process according to claim 1, wherein the flame-retardant polyamide FR has a nonflammability which meets the mandates of the UL 94 V-0 protocol.

6. The process according to claim 1, wherein the relative viscosity of the flame-retardant polyamide FR (measured according to DIN 51562) attains between at least 2.4 and 4.0.

7. The process according to claim 1, wherein the flame-retardant polyamide FR is based on one of the following diamine and dicarboxylic acid combinations:

PA6.9 (hexamethylenediamine/azelaic acid),
PA6.12 (hexamethylenediamine/dodecanoic acid),
PA4.6 (tetramethylenediamine/adipic acid),
PA12.12 (dodecanediamine/dodecanedioic acid) or
PA6.6 (hexamethylenediamine/adipic acid).

8. The process according to claim 1, wherein the flame-retardant polyamide FR is combined with a further non flame-retardant polyamide 6 (polycaprolactam).

9. A process according to claim 1, characterized in that the built up pressure is lowered to 1 to 100 mbar.

10. A process according to claim 9, characterized in that the built up pressure is lowered to 1 to 10 mbar.

11. A process according to claim 1, wherein the flame-retardant polyamide FR is mixed with a further, non phosphorus-containing, non flame-retardant polyamide.

12. A process according to claim 1, wherein the amount of water is not more than 25 wt % and at least 10 wt %.

13. A process according to claim 1, wherein $R^2$ and $R^3$ are a $C_1$-$C_3$ alkyl group or an aryl group having up to three fused or unfused rings.

14. The process according to claim 13, wherein the $C_1$-$C_3$ alkyl group is a methyl, ethyl, and/or a 2-propyl group.

15. A process according to claim 1, wherein $R^2$ and $R^3$ are a phenyl, benzyl, naphthyl, phenanthryl, mesityl or tolyl group, an alkylaryl group, a triphenylmethyl group, an arylalkyl group, an i-propylphenyl, t.butylphenyl or nonylphenyl group.

16. A process according to claim 1, wherein $R^4$ is a linear, cyclic or branched $C_1$-$C_{10}$ alkylene.

17. A process according to claim 1, wherein $R^4$ is a $C_1$-$C_4$ alkylene group, a $C_1$-$C_{10}$ alkenylene, a $C_6$-$C_{10}$ arylene or a 1,4-phenylene group.

18. A process according to claim 1, further comprising forming said product as a filament.

\* \* \* \* \*